J. F. ENGLE.
INTERRUPTER CIRCUIT AND APPARATUS.
APPLICATION FILED JUNE 12, 1907.
921,601.
Patented May 11, 1909.
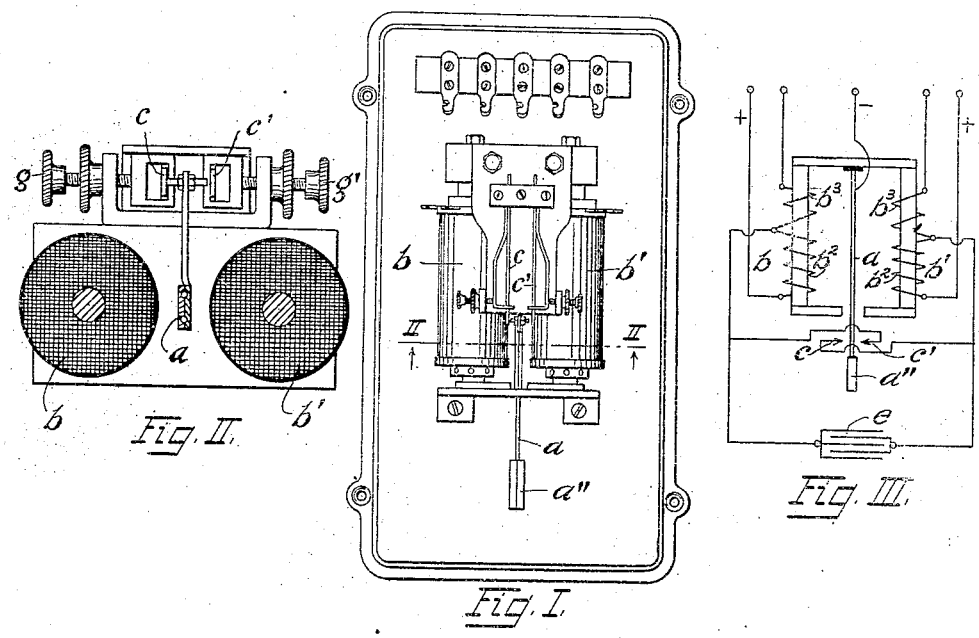
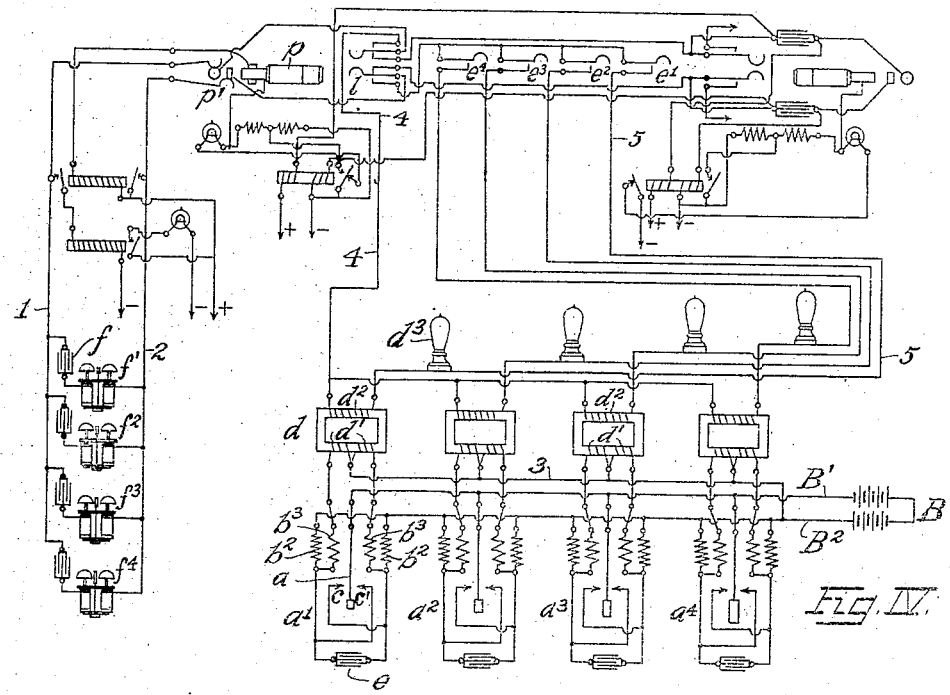
Witnesses:
F. C. Valentine
V. G. Armstrong.
Inventor,
John F. Engle,
by his attorney.

UNITED STATES PATENT OFFICE.

JOHN F. ENGLE, OF CLEVELAND, OHIO, ASSIGNOR TO THE NORTH ELECTRIC COMPANY, OF CLEVELAND, OHIO, A CORPORATION OF OHIO.

INTERRUPTER CIRCUIT AND APPARATUS.

No. 921,601.  Specification of Letters Patent.  Patented May 11, 1909.

Application filed June 12, 1907. Serial No. 378,549.

*To all whom it may concern:*

Be it known that I, JOHN F. ENGLE, a citizen of the United States of America, and a resident of Cleveland, in the county of Cuyahoga and State of Ohio, have invented certain new and useful Improvements in Interrupter Circuits and Apparatus, of which the following is a specification.

My invention relates to improvements in interrupter circuits and apparatus, having for its object the provision of an interrupter adapted to transmit the pulsatory or alternating currents especially adapted for signaling purposes, wherein simplicity of design, low cost of operation and high efficiency are attained.

My invention being particularly designed for employment in connection with telephone systems to effect selective signaling, will be described as embodied to practice the same in this useful form, although not necessarily limited thereto.

For reasons of economy and adaptability, battery currents are preferable for signaling purposes, which may either be applied directly to the line, or may be transmitted through the medium of converters in the well known manner. With selective currents, however, it is desirable to adjust the frequencies of interruption, and to eliminate numerous contacts and avoid sparking therebetween, particularly with the interrupters supplying the higher frequencies. Moreover, it is important that the interrupter shall not be retarded or impeded in its operation when momentarily connected in circuit to supply an unusual amount of signaling current. These, and other requirements, have been borne in mind in evolving the present invention, which is here explained in connection with a selective or harmonic signaling system for a four-party telephone line. The interrupter device thereof, which I may here explain in a preliminary way, consists of a vibrating member connected directly to one pole of the battery, or other source of current, and is normally actuated by means of two coils of relatively high resistance in shunt relation respectively with two low resistance coils connected to the translating device, or to primary windings of a converter. By reason of the normally open circuit to the translating device, or because of the impedance of the converter, little or no current will be required for the normal operation of the interrupter, through the alternative action of the shunt coils. However, upon the accession of load, the vibratory member will be placed alternatively under the influence of the series coils, from which the principal signaling current is then supplied, and the action of the interrupter is immediately augmented. These two sets of series and shunt coils are connected respectively to two contacts of the interrupter, which preferably are bridged by a condenser and lead to the other pole of the battery or source of the current.

Having explained so much of my improvement, I may now make reference to the accompanying sheet of drawings, wherein the features of my invention as embodied in a telephone system, are graphically and diagrammatically set forth.

Figure I of said drawing shows in plan view an interrupter device best adapted for practicing my invention. Fig. II is a detail thereof. Fig. III is a diagram of the circuits of an interrupter and its associated converter; while Fig. IV illustrates the present invention as applied to the cord circuit of a four-party selective telephone line.

Throughout the several figures of the drawing, I have employed the same character of reference to indicate similar parts.

Referring first to the interrupter, it will be seen that the vibrating member or reed $a$, equipped with a variable weight $a''$, is designed, under the influence of laterally positioned electro-magnets $b\ b'$, alternatively to engage the contact springs $c\ c'$ thereof. These electro-magnets each comprise a high and a low resistance coil $b^2\ b^3$, shunting each other and terminating respectively in the contact springs $c\ c'$. In the preferred embodiment of my invention, the source of current, as battery B, has one of its poles connected directly with the tongue or vibrating member $a$ of the interrupter, while the other pole of the battery is connected directly with the high resistance shunt coils $b^2$, and preferably through the windings $d'\ d'$ of a converter $d$, with the low resistance coils $b^3$, in series with said windings. It will be understood, however, that the series windings may be connected instead, directly to any suitable translating device or switch mechanism without the intermediation of the converter. The respective windings upon the electro-magnets $b\ b'$ are cumulative in effect, and their respective excitations generate poles of like sign in each of the magnet cores. The reed or tongue $a$ preferably is of steel and is polarized, more readily to respond to the excitation of the magnet coils. Bridged about the contact springs $c$ $c'$ and their respective associated windings $b^2$ $b^3$ is the condenser $e$. As shown in the diagram, Fig. IV, the secondary $d^2$ of each converter $d$, is connected through a resistance lamp $d^3$ with the corresponding contacts $e'$, $e^2$, $e^3$, $e^4$ of an operator's selective key, controlling the flow of current to the calling plug $p$ of the cord circuit, which is shown inserted in the jack $p'$ of a four-party selective telephone line. Each station upon said line, connected between conductors 1, 2, is designated by a signaling bell $f'$, $f^2$, $f^3$, $f^4$ with its associated condenser $f$; the ordinary substation apparatus being omitted as unnecessary. Moreover, the customary cord circuit and line signaling apparatus is conventionally indicated in the diagram, sufficiently to illustrate the principal application of the invention, but I do not consider that these features require explanation herein.

Each of the interrupters $a'$, $a^2$, $a^3$, $a^4$ is connected in circuit precisely as explained above, employing converters $d$ whereby to transmit current to the signaling circuit, but the reeds or vibrating members of said interrupters and their weights, are respectively made stiffer and lighter for the high frequencies, and more flexible and heavier for the low frequencies. Practically any desired number of these adjusted interrupters may be employed. With respect to the windings upon the electro-magnets $b$ $b'$ of these interrupters, the series coils, are provided with more turns upon the high frequency interrupters than upon the low, while the co-acting shunt coils are provided with fewer turns upon the coils of the high frequency interrupters, than upon the corresponding windings of the low frequency interrupters. Preferably this is found to be desirable in practice, for the reason that with the stiffer reeds and higher rates of vibration, more work must be done by the high frequency electro-magnets, and as an example of approximately the preferred number of turns for a four-party line employing twenty-four volts on the primaries, I may say that the highest frequency interrupter will have 100 turns upon its series coil, and 6500 turns upon the shunt coil, while the lowest frequency interrupter will have 40 turns upon the series coil, and 12,500 turns upon its shunt coil; the windings upon the other interrupters being intermediate of these two. I have preferably wound the secondaries to generate 160 volts in the signaling circuit, and this I find is transmitted with relatively small drop in voltage, even to the most distant stations. This is because of the fact that the series coils are energized by the full flow of current and impart a more powerful vibratory movement to the contact member $a$, thereby insuring a longer closure of the respective magnet circuits, tending to secure approximate magnetic saturation of the iron body of the converter, and thereby transmitting the maximum voltage from the secondary winding. This operation probably will be better understood by making further reference to the diagram, Fig. IV, and assuming that one of the stations is to be rung, as station $f'$. Assuming too, that the line has been tested, and the calling plug $p$ inserted in the proper jack, the operator will actuate her selective key, closing together the contacts $e'$. All of the interrupters are in operation under the impulse of their respective shunt windings, but upon the closure of the contacts $e'$, the impedance of the converter connected with interrupter $a'$ will immediately be reduced, since its secondary is thus closed, thereby permitting the flow of exciting current through the divided primary windings $d'$. Current may be traced from the upper pole of the battery, through the common conductor to the vibrating member $a$, contact $c$, series winding $b^2$, the right hand portion of the primary winding $d'$ and conductor 3 to the lower pole of the battery. The vibratory member is augmented in its motion and is actuated by the series winding out of engagement with contact $c$ and into engagement with contact $c'$, thereby opening circuit with contact $c$ and its connected windings, and closing the circuit with contact $c'$ and the connected windings upon the left. Current then flows through windings $b^3$ thereof, and the left hand coil of the primary winding $d'$ upon the converter. This, as will be well understood, causes alternating currents of the required frequency to flow through the circuit closed by the plug and contacts $e'$; said circuit being traced from the left hand side of the secondary $d^2$ through conductor 4, the contacts of the operator's key $l$ to the tip of the plug, conductor 1, through the bell $f'$, conductor 2, the sleeve of the plug, the contacts of the operator's key, and contacts $e'$ (assumed to be closed), and conductor 5 to the right hand side of the secondary windings. The bell $f'$ will, of course, respond to this current of proper frequency, while the remaining bells upon the line circuit will fail to be actuated, as will be well understood by those conversant with the art.

Thus I have set forth a typical embodiment of my invention, from which it will be appreciated that simply with two alternative contacts and associated series and shunt actuating windings upon the electro-magnets, that under conditions of no load, the interrupters will be actuated through the high resistance coils at a minimum expenditure of battery power, while under conditions of load, and proportionate thereto, the series coils will build up and impart to the vibrating member, additional momentum to insure longer closure of the interrupted circuits upon each vibration. An associated condenser not only serves to overcome sparking at the contact points, but by reason of its charge and discharge, augments the exciting currents in a well known manner. The lamp resistances connecting in the secondary circuits, are provided merely as well known safe-guards against the flow of excessive current.

In practice, each of the interrupters, upon installation is connected in circuit as shown. The adjusting screws $g$ $g'$, are separated to such an extent that neither of the contact springs $c$ $c'$ is in engagement with the vibratory member $a$. One of these screws as $g$ is then turned until the contact spring $c$ is brought into engagement with the contact of the vibratory member, whereupon it will start under the impulse of but a single magnet. This screw is then turned back slightly, say to the extent of one quarter turn, and the opposing screw $g'$ is then turned until the contact $c'$ similarly is brought into engagement with the contact of the vibrating member, whereupon this screw is also set in its adjusted position and the interrupter device will continue normally under the impulse of its shunt windings. It will be seen, however, that with a slight bias, the vibrating member may be actuated by a single electro-magnet, but preferably I employ the arrangement herein set forth.

Having now set forth the embodiment of my invention and explained one of its practical applications to signaling circuits, I claim as new and desire to secure by Letters Patent, the following:—

1. The combination with a source of current, of a vibratory contact member connected thereto, two opposing contacts adapted alternatively to be engaged thereby, and electro magnetic apparatus for securing the vibration of the contact member, comprising actuating windings of relatively high resistance normally connected with the source of current, and low resistance windings shunted thereby and in series relation with the translating device, substantially as set forth.

2. In an interrupter device for electric circuits, the combination with a vibratory contact member, two contact parts adapted alternatively to be engaged thereby, two laterally positioned, actuating magnets connected respectively with said contact parts and provided with series and shunt windings, and means for normally checking the flow of current through the series windings, substantially as set forth.

3. In apparatus for transmitting alternating currents, the combination with a converter, of an associated source of direct current and an interrupter device; the latter comprising a vibratory contact member connected with the source of current, two contact parts adapted alternatively to be engaged thereby, and electro magnetic actuating means for the vibrating member, comprising an excited core and series and shunt windings respectively connected with the converter and with the source of current, and further connected to receive exciting currents through the circuit closed by the vibrating member, substantially as set forth.

4. In apparatus for transmitting alternating currents, the combination with a converter having secondary windings supplying the associated circuit and divided primary windings, of a source of direct current, and an interrupter device associated with the converter, comprising a vibratory contact member connected with the source of current, two contact parts alternatively engaged by said member and connected to control the flow of current to the primary windings of the converter, and electro-magnetic apparatus excited by current transmitted through the vibratory contact member; the same having shunt windings normally actuating the vibratory member and series windings connected each to each with the divided primary windings of the converter, substantially as set forth.

5. The combination with a converter, having a secondary winding adapted to be connected with a signaling circuit and a divided primary winding, of a source of direct current, and an interrupter appliance, both associated with said converter; the latter comprising a vibratory contact member and two actuating electro-magnets each having shunt windings connected with the source of current, and low resistance windings respectively connected with the divided primaries to insure reverse magnetic excitation, and two reversely-positioned contact parts between which the vibratory member is actuated; said contact parts being respectively connected with the windings of the electro-magnets, substantially as set forth.

6. In an interrupter appliance, the combination with a vibratory member, of two alternative contact parts between which it moves; said contact parts having permanent connection with the source of current, and electro-magnetic means for securing the vibration of said member, comprising series and shunt magnet windings, connected with said contact parts, substantially as set forth.

7. In apparatus of the class described, the combination with a converter, of a source of direct current and an interrupter device; the latter comprising a vibratory member connected with one pole of the source of current, electro-magnetic actuating means having shunt windings connected with the other pole of said source of current, reversely arranged contacts alternatively engaged by the vibrating member, and actuating series windings connected with the primary windings of the converter, substantially as set forth.

8. In an interrupter appliance, the combination with a vibratory member adapted to be connected with one pole of the source of current, two relatively high resistance windings of actuating electro-magnetic means, adapted to be connected with the opposing pole of the source of current, two relatively low resistance windings thereon, respectively shunted by the former, and two reversely positioned contacts between which the vibratory member plays, and which are respectively connected to terminals of the high and low resistance windings, substantially as set forth.

9. In apparatus of the class described, the combination with signaling-circuit terminals, of a converter having its secondary winding adapted to be connected with said circuit, and divided primary windings, a source of current, a vibrating member connected with one pole thereof, two reversely positioned contacts alternatively engaged thereby, and two actuating electro-magnets each having a high resistance shunt coil connected between one of the contacts and the opposing pole of the source of current, and a low resistance series coil respectively connected with the divided windings of the converter, substantially as set forth.

Signed at Cleveland, this tenth day of June, A. D. 1907 in the presence of the witnesses subscribing their names below.

JOHN F. ENGLE. [L. s.]

Witnesses:
A. H. GRISWOLD,
C. H. LORTEE.